(12) United States Patent
Zhang et al.

(10) Patent No.: US 8,801,441 B2
(45) Date of Patent: Aug. 12, 2014

(54) POP-UP MECHANISM HAVING A BUTTON AND SLIDING PILLARS

(71) Applicants: Fu Tai Hua Industry (Shenzhen) Co., Ltd., Shenzhen (CN); Hon Hai Precision Industry Co., Ltd., New Taipei (TW)

(72) Inventors: Jun-Liang Zhang, Shenzhen (CN); Che-Yu Chou, New Taipei (TW); Qun Huang, Shenzhen (CN); Tai-Shan Zhu, Shenzhen (CN); Wen-Chih Lan, New Taipei (TW); Tao Jiang, Shenzhen (CN); Hai-Qian Ge, Shenzhen (CN); Wei-Wei Yu, Shenzhen (CN); Zhi-Jun Shi, Shenzhen (CN); Ji-Bing Guo, Shenzhen (CN); Hua-Yong Wang, Shenzhen (CN); Zhou Chen, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/720,891

(22) Filed: Dec. 19, 2012

(65) Prior Publication Data

US 2013/0157488 A1    Jun. 20, 2013

(30) Foreign Application Priority Data

Dec. 20, 2011    (CN) .......................... 2011 1 0428770

(51) Int. Cl.
*H01R 13/62*    (2006.01)

(52) U.S. Cl.
USPC ......................................................... 439/131

(58) Field of Classification Search
None
See application file for complete search history.

(56) References Cited

U.S. PATENT DOCUMENTS

| | | | |
|---|---|---|---|
| 8,545,260 B2 * | 10/2013 | Zhou et al. ..................... | 439/501 |
| 8,638,563 B2 * | 1/2014 | Peng et al. ..................... | 361/740 |
| 2006/0166533 A1 * | 7/2006 | Muramatsu et al. .......... | 439/160 |
| 2012/0220162 A1 * | 8/2012 | Zhou et al. ..................... | 439/501 |
| 2013/0260584 A1 * | 10/2013 | Zhang et al. .................. | 439/159 |

* cited by examiner

*Primary Examiner* — Chandrika Prasad
(74) *Attorney, Agent, or Firm* — Novak Druce Connolly Bove + Quigg LLP

(57) ABSTRACT

An electrical charger for charging an electronic device includes a base, a connector, and a pop-up mechanism. The connector is exposed out of the base for connecting the electronic device. The pop-up mechanism is received in the base and includes a number of pushing pillars and a button set on the base. The pushing pillars are slidably set beside the connector. A top end of each pushing pillar extends out of the base. The button drives the pushing pillars to slide upwards, pushing the electronic device away from the connector when the charging operation is completed.

20 Claims, 6 Drawing Sheets

POP-UP MECHANISM HAVING A BUTTON AND SLIDING PILLARS

BACKGROUND

1. Technical Field

The present disclosure relates to pop-up mechanisms, and more particularly, to a pop-up mechanism used in an electronic device charger such as a cellular phone charger.

2. Description of Related Art

Generally, an electronic device charger such as a cellular phone charger uses a charging connector to connect the cellular phone. The cellular phone needs to be separated from the charging connector when the charging is finish. A user has to use two hands to separate the cellular phone from the cellular phone charger when the cellular phone charger is itself not firmly fixed. This may be inconvenient for the user.

Therefore, it is desirable to provide a means which can overcome the above-mentioned problems.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Embodiments of the present disclosure will now be described in detail below, with reference to the accompanying drawings.

Figure 1:
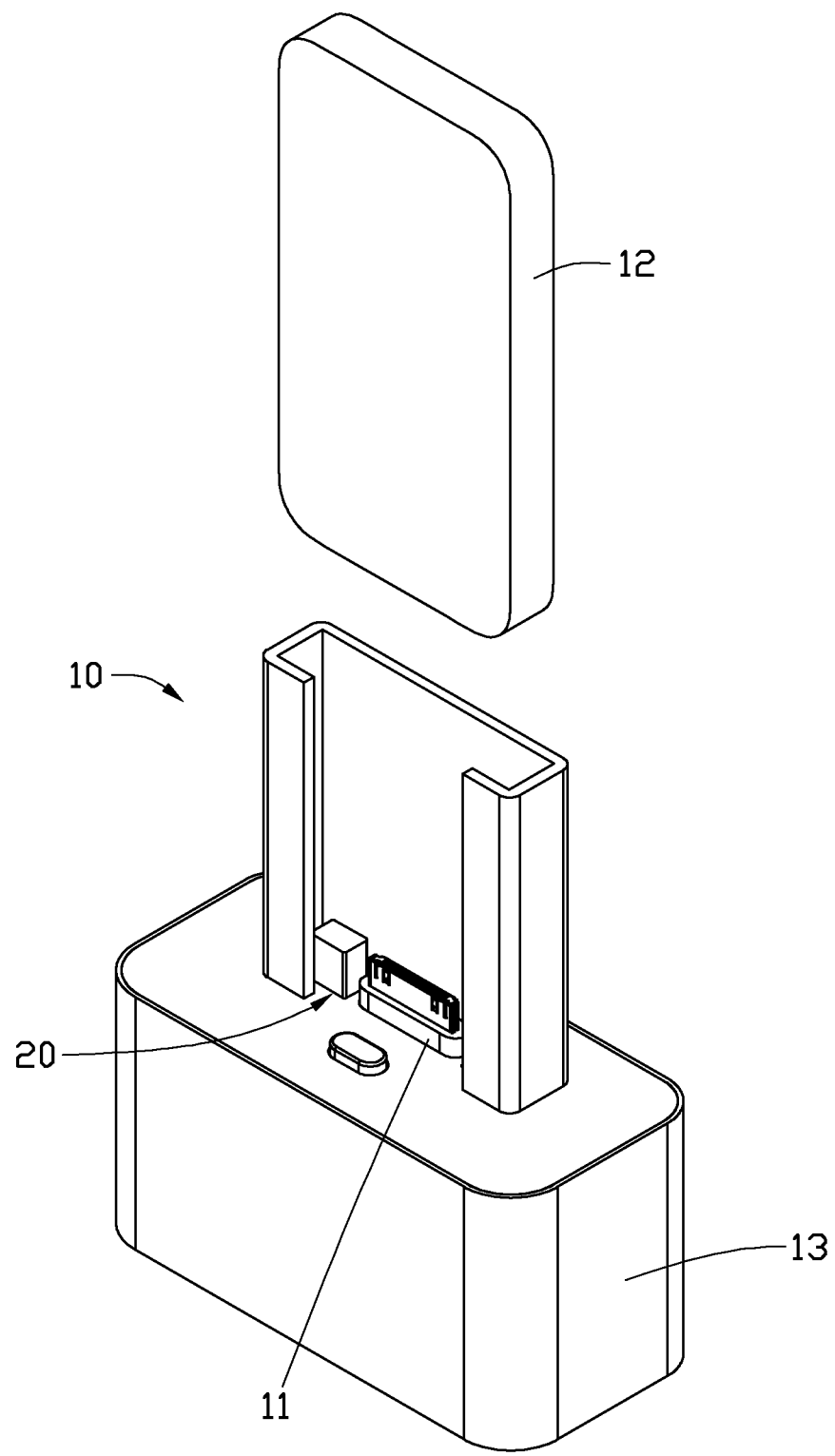
FIG. 1 is an isometric view of a charger for charging an electronic device, according to an exemplary embodiment.
Figure 2:
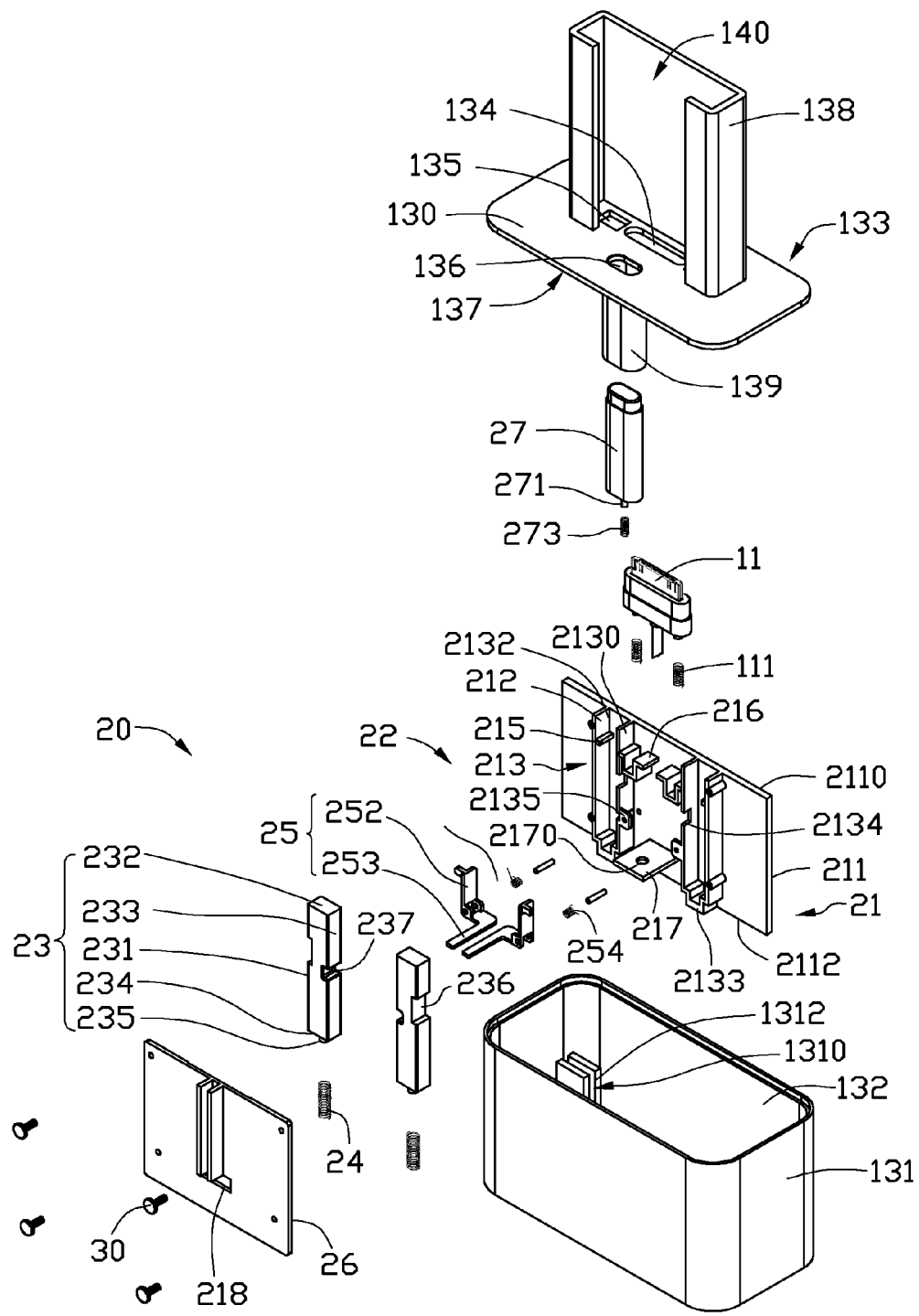
FIG. 2 is an exploded view of the charger of FIG. 1.

FIGS. 1 and 2 illustrate an electrical charger 10 in accordance with an exemplary embodiment. The electrical charger 10 connects an electronic device 12 and provides electrical power to charge the electronic device 12. In this embodiment, the electronic device 12 is a cellular phone. The electrical charger 10 includes a base 13, a connector 11, and a pop-up mechanism 20. The connector 11 is exposed out of the base 13 to connect the electronic device 12. The pop-up mechanism 20 includes a button 27, and a pair of pushing pillars 23 set on two opposite sides of the connector 11. The button 27 drives the pushing pillars 23 to slide along a direction parallel to the connector 11, for pushing the electronic device 12 away from the connector 11.

The base 13 includes a receiving case 131 having a top opening 132, and a cover 133 for covering the top opening 132. The cover 133 defines a connector through hole 134, a number of engaging through holes 135, and a button through hole 136 therein. In this embodiment, the cover 133 defines two engaging through holes 135 respectively at two opposite sides of the connector through hole 134. The cover 133 includes an upper surface 130, a lower surface 137, a positioning sidewall 138, and a receiving sidewall 139. The lower surface 137 is parallel to the upper surface 130. The positioning sidewall 138 extends perpendicularly up from the upper surface 130, and can be considered to substantially encircle the connector through hole 134 and the engaging through holes 135. The positioning sidewall 138 is shaped to guide the electronic device 12 therein in a downward direction to connect the connector 11. Thus the positioning sidewall 138 defines a trackway 140 therein. The receiving sidewall 139 extends perpendicularly down from the lower surface 137, and can be considered to encircle the button through hole 136.

The pop-up mechanism 20 further includes a transmission structure 22. The button 27 drives the pushing pillars 23 via the transmission structure 22. The transmission structure 22 includes a base board 21, a pair of transmission pieces 25, and a fastening board 26.

The base board 21 includes a base plate 211, a pair of restricting units 213, a pair of supports 216, and a holding plate 217. The base plate 211 includes an upper edge 2110, and a lower edge 2112 parallel and opposite to the upper edge 2110, as shown in FIG. 2. The restricting units 213, the supports 216, and the holding plate 217 are formed on an inner side of the base plate 211.

Each restricting unit 213 is substantially "U" shaped, and defines an upper opening 212 substantially coplanar with the upper edge 2110. The restricting unit 213 also includes a locking sidewall 2130, a restricting sidewall 2132, and a bottom sidewall 2133. The locking sidewall 2130 is parallel to the restricting sidewall 2132. The bottom sidewall 2133 connects the locking sidewall 2130 with the restricting sidewall 2132, and is opposite to the upper opening 212. The pair of restricting units 213 extends from the base plate 211, and the restricting units 213 are parallel to each other along their longitudinal direction. The locking sidewalls 2130 of the two restricting units 213 face each other.

Each of the restricting sidewalls 2132 includes a positioning protrusion 215 extending from an inner side surface thereof. Each of the restricting units 213 also defines a locking cutout 2134 in the locking sidewall 2130. The positioning protrusions 215 of the restricting units 213 are closer to the upper edge 2110 than the locking cutouts 2134. Each of the locking sidewalls 2130 includes a connecting protrusion 2135 extending perpendicularly inward from an inner edge thereof. Thus, the connecting protrusion 2135 is parallel to the base plate 211. The connecting protrusion 2135 is closer to the lower edge 2112 than the locking cutout 2134. Each support 216 is substantially "U" shaped, and the supports 216 are formed between the pair of restricting units 213. Tops of the supports 216 are aligned and substantially coplanar with each other, and the top of each support 216 is aligned and substantially coplanar with a top of the corresponding positioning protrusion 215.

The holding plate 217 perpendicularly extends from the base plate 211 between the pair of restricting units 213. The holding plate 217 defines a positioning through hole 2170 in a portion thereof away from the base plate 211.

Figure 3:
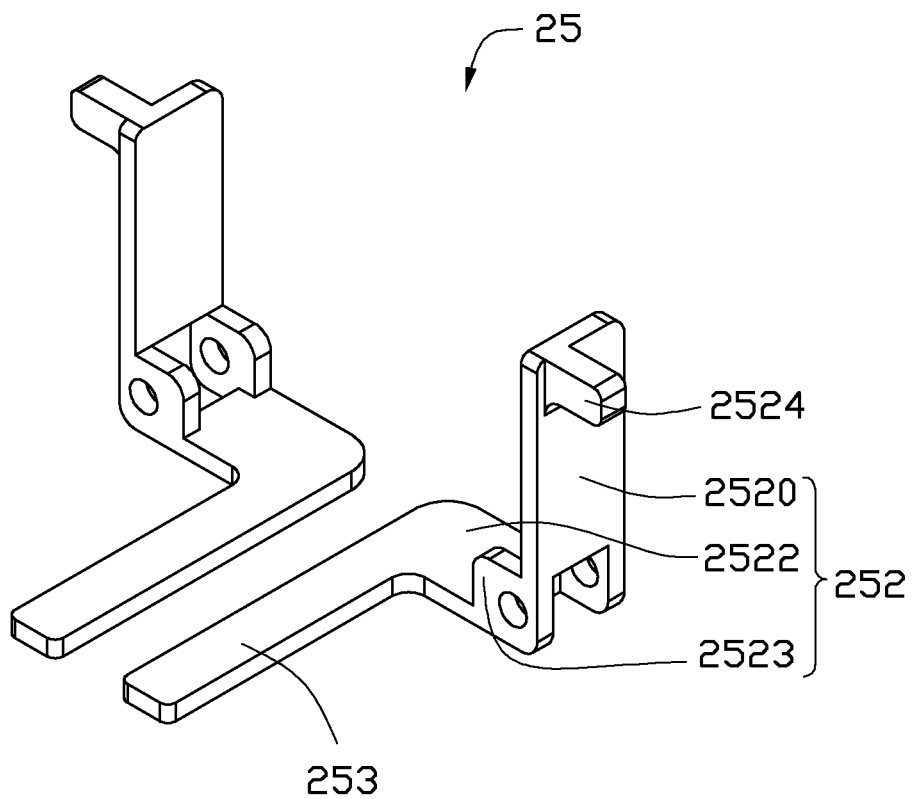
FIG. 3 is an enlarged, isometric view of two transmission pieces of the charger of FIG. 2.

FIGS. 2 and 3 best show that each of the transmission pieces 25 includes a locking arm 252 and an engaging arm 253. The locking arm 252 is a substantially "L" shaped plate, and includes a locking part 2520, a connecting part 2522, and a pair of connecting ears 2523. The locking part 2520 is perpendicular to the connecting part 2522, and a bottom end of the locking part 2520 is connected to the connecting part 2522 via the pair of connecting ears 2523. A locking protrusion 2524 extends from a top end of locking part 2520, along a direction opposite to a direction in which the connecting part 2522 extends away from the locking part 2520. The engaging arm 253 extends from an end of the connecting part 2522 that is away from the locking part 2520, along a direction perpendicular to both a longitudinal direction of the connecting part 2522 and a longitudinal direction of the locking part 2520.

The fastening board 26 defines an assembly through hole 218 corresponding to the holding plate 217.

Each pushing pillar 23 is substantially an elongated rectangular block, and includes an elongated locking surface 233, an elongated positioning surface 231, a top surface 232, a bottom surface 234, and a connecting post 235. The locking surface 233 and the positioning surface 231 are located at two opposite lateral sides of the pushing pillar 23, and are parallel to each other. The locking surface 233 abuts a corresponding one of the locking sidewalls 2130, and the positioning surface 231 abuts a corresponding one of the restricting sidewalls 2132. The top surface 232 is parallel to the bottom surface 234, and perpendicularly connects with the locking surface 233 and the positioning surface 231. The connecting post 235 perpendicularly extends from a center of the bottom surface 234. The pushing pillar 23 defines a locking groove 237 in the locking surface 233, and a positioning groove 236 in the positioning surface 231.

The receiving case 131 includes a pair of fastening pieces 1310 at opposite lateral sides of an interior thereof, respectively (only one fastening piece 1310 is visible in FIG. 2). Each of the fastening pieces 1310 includes a pair of clamping arms 1312, and defines a gap (not labeled) between the clamping arms 1312.

The button 27 is substantially an elongated cylinder. The button 27 includes an engaging post 271 extending from a bottom thereof.

Figure 4:
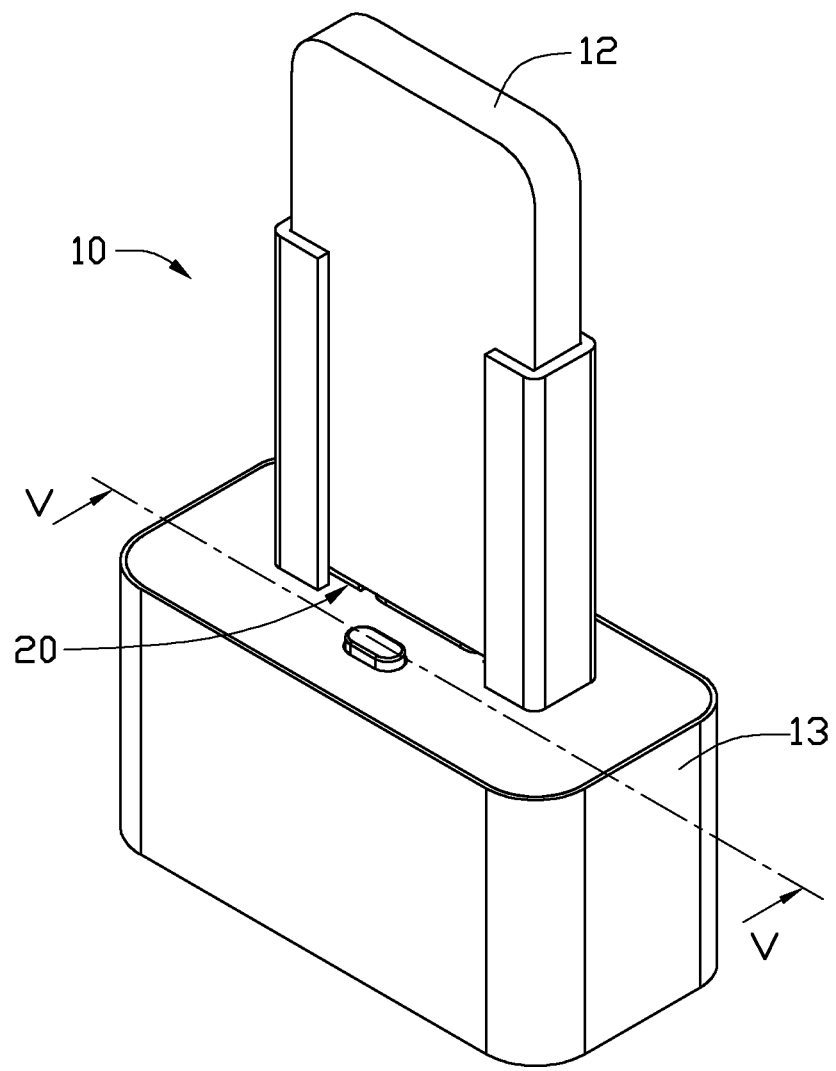
FIG. 4 is an assembled view of the charger and electronic device of FIG. 1.

FIGS. 2 and 4 show that in assembly, the connector 11 is placed between the restricting units 213, and is resiliently supported by the supports 216 via a pair of first springs 111. The pushing pillars 23 are correspondingly and slidably received in the restricting units 213. Each pushing pillar 23 resiliently connects the bottom sidewall 2133 via a second spring 24 connected around the connecting post 235. The positioning protrusion 215 is received in the positioning groove 236 of the pushing pillar 23 to restrict the sliding range of the pushing pillar 23.

Each transmission piece 25 is placed into a gap between a corresponding one of the connecting protrusions 2135 and the base plate 211. A third spring 254 is placed between the pair of connecting ears 2523 of the transmission piece 25. A corresponding shaft passes through the corresponding connecting protrusion 2135, the connecting ears 2523 and the third spring 254 of the transmission piece 25, and a corresponding hole (see FIG. 2, not labeled) of the base plate 211, to rotatably connect the transmission piece 25 to the corresponding locking sidewall 2130. The locking protrusion 2524 inserts into the corresponding locking cutout 2134. The fastening board 26 is fastened to the base board 21 via a number of fasteners 30, such as bolts. The holding plate 217 and the engaging arms 253 pass through the assembly through hole 218 when the fastening board 26 is fastened to the base board 21.

The transmission structure 22 is firmly fixed in the receiving case 131 by the clamping arms 1312 interferentially clamping the combined base board 21 and fastening board 26. Top parts of the pushing pillars 23 close to the upper surface 130 extend out of the restricting unit 213 via the upper openings 212. The connector 11 extends up beyond the base board 21 from the upper edge 2110. The button 27 is supported on the engaging arms 253. The engaging post 271 passes through a gap between the engaging arms 253 and resiliently engages in the positioning through hole 2170 via a fourth spring 273. The cover 133 covers the base 13. The button 27 is received in the receiving sidewall 139. A top end of the button 27 extends up beyond the base 13 via the button through hole 136. The connector 11 extends up beyond the base 13 via the connector through hole 134. The top part of each pushing pillar 23 extends up beyond the base 13 via the corresponding engaging through hole 135. In this embodiment, each of the two third springs 254 is a torsion spring. The first, second, and fourth springs 111, 24, and 273 are a number of coil springs.

Figure 5:
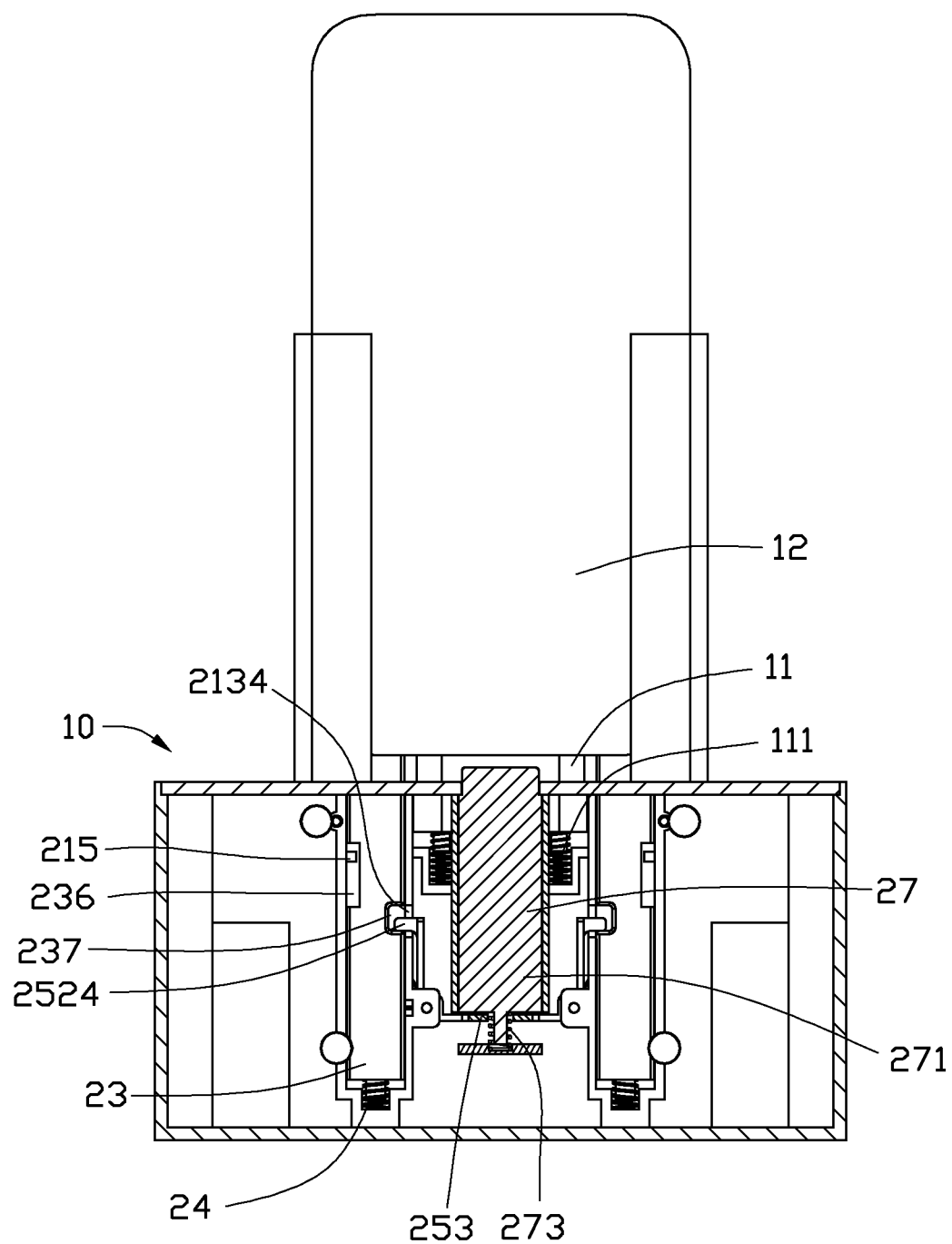
FIG. 5 is a cross-sectional view taken along line V-V of FIG. 4, showing the electronic device connected to a connector of the charger.
Figure 6:
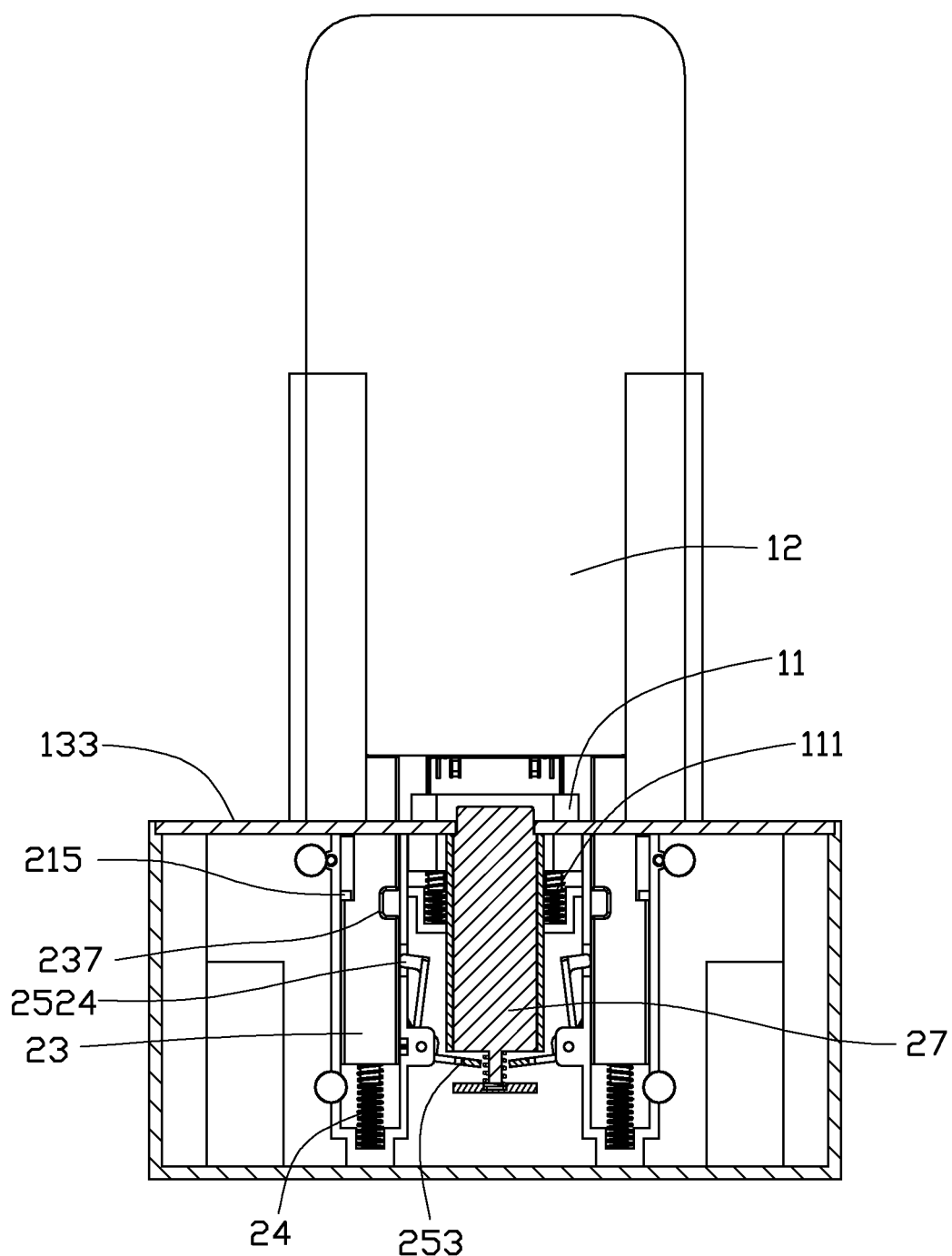
FIG. 6 is similar to FIG. 5, but showing the electronic device pushed up away from the connector.

FIGS. 4-6 show that in use, when the electronic device 12 has been moved down and connected to the connector 11, the pushing pillars 23 are pressed downwards by the bottom of the electronic device 12. The second springs 24 are compressed by the pushing pillars 23. The locking grooves 237 are correspondingly aligned with the locking cutouts 2134. Thus, a twist force (i.e. a restoring force) generated by the release of elastic potential energy of each third spring 254 rotates the corresponding transmission piece 25, whereby the locking protrusion 2524 inserts into the corresponding locking groove 237 to hold the corresponding pushing pillar 23 in position.

When the electronic device 12 needs to be disconnected from the connector 11, the button 27 is pressed downwards to push the engaging arms 253. Each engaging arm 253 rotates downward towards the restricting unit 213 to make the corresponding transmission piece 25 rotate accordingly. Such rotation overcomes the twist force of the corresponding third spring 254 and drives the corresponding locking protrusion 2524 to move out of the corresponding locking groove 237. Thereupon, the pair of pushing pillars 23 is pushed to slide upwards by elastic restoring forces of the second springs 24. The electronic device 12 is thus pushed away from the connector 11 by the pair of pushing pillars 23.

When the electronic device 12 needs to be plugged into the connector 11 again, the electronic device 12 is slid along the trackway 140, and pushes the pushing pillars 23 downwards until the locking grooves 237 are once again aligned with the locking cutouts 2134. The locking protrusions 2524 are driven to be inserted into the locking grooves 237 by elastic restoring forces of the third springs 254. Thus, the pushing pillars 23 are held in position by the locking protrusions 2524 when the electronic device 12 is connected to the connector 11.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A pop-up mechanism comprising:
   a restricting unit adapted to be in a fixed position parallel to a base board, the restricting unit comprising a vertical locking sidewall and a bottom sidewall connecting the locking sidewall, the locking sidewall defining a locking cutout therein;
   a pushing pillar slidably received in the restricting unit and resiliently connected to the bottom sidewall of the restricting unit via a first spring, the pushing pillar defining a locking groove corresponding to the locking cutout of the locking sidewall;
   a transmission piece rotatably connected to the locking sidewall and comprising a locking arm and an engaging arm coupled to the locking arm, the locking arm comprising a locking protrusion aligned with the locking cutout of the locking sidewall; and a button adapted to be slidable relative to the base board, the button positioned for pressing the engaging arm down;

wherein when the pushing pillar is slid to a position where the locking groove aligns with the locking cutout, the transmission piece automatically rotates and the locking protrusion inserts into the locking groove via the locking cutout thereby restricting the pushing pillar from sliding; and when the button is pressed and presses the engaging arm down, the transmission piece rotates and moves the locking protrusion of the locking arm out of the locking groove, whereupon the pushing pillar is pushed to slide up in the restricting unit by restoring force of the first spring.

2. The pop-up mechanism of claim 1, wherein the restricting unit further comprises a restricting sidewall parallel to the locking sidewall, the bottom sidewall connects the locking sidewall with the restricting sidewall, the restricting unit defines an upper opening opposite to the bottom sidewall, and the restricting sidewall comprises a positioning protrusion extending from an inner side surface thereof.

3. The pop-up mechanism of claim 2, wherein the positioning protrusion is closer to the upper opening than the locking cutout.

4. The pop-up mechanism of claim 2, wherein the pushing pillar comprises a locking surface corresponding to the locking sidewall, and the locking groove is defined in the locking surface.

5. The pop-up mechanism of claim 4, wherein the pushing pillar further comprises a positioning surface parallel to the locking surface, and further defines a positioning groove in the positioning surface, and the positioning protrusion is located in the positioning groove thereby restricting the range of sliding movement of the pushing pillar.

6. The pop-up mechanism of claim 1, wherein the locking arm comprises a locking part, a connecting part, and a pair of connecting ears, the locking part is perpendicular to the connecting part and is connected to the connecting part by the pair of connecting ears, and the locking protrusion extends from a top end of the locking part along a direction substantially opposite to a direction in which the connecting part extends away from the locking part.

7. The pop-up mechanism of claim 6, wherein the engaging arm extends from an end of the connecting part that is away from the locking part, along a direction perpendicular to both a longitudinal direction of the connecting part and a longitudinal direction of the locking part.

8. The pop-up mechanism of claim 6, wherein the connecting ears are rotatably connected to the locking sidewall, and the transmission piece is biased by a torsion spring such that the torsion spring urges the transmission piece to rotate and cause the locking protrusion to insert into the locking groove when the locking groove aligns with the locking cutout.

9. The pop-up mechanism of claim 1, further comprising a holding plate adapted to be in a fixed position substantially perpendicular to the base board, wherein the holding plate defines a positioning through hole, and a bottom of the button is slidably received in the positioning through hole and held in a stationary position by a second spring.

10. The pop-up mechanism of claim 9, further comprising a fastening board adapted to be fastened to the base board thereby restricting the pushing pillar and the transmission piece on the base board, wherein the fastening board defines an assembly through hole corresponding to the holding plate, and the holding plate and the engaging arm pass through the assembly through hole when the fastening board is fastened to the base board.

11. An electrical charger for charging an electronic device, the electrical charger comprising:
a base;
a connector exposed out of the base for connecting the electronic device; and
a pop-up mechanism received in the base and comprising:
a plurality of pushing pillars slidably set beside the connector, a top end of each pushing pillar extending out of the base; and
a button set on the base;
wherein the button drives the pushing pillars to slide upwards and push the electronic device away from the connector when the button is pressed.

12. The electrical charger of claim 11, wherein the pop-up mechanism further comprises:
a restricting unit adapted to be in a fixed position parallel to a base board, the restricting unit comprising a vertical locking sidewall and a bottom sidewall, the locking sidewall defining a locking cutout therein; and
a transmission piece rotatably connected to the locking sidewall and comprising a locking arm and an engaging arm coupled to the locking arm, the locking arm comprising a locking protrusion aligned with the locking cutout of the locking sidewall;
and the pushing pillar is slidably received in the restricting unit and is resiliently connected to the bottom sidewall of the restricting unit via a first spring.

13. The electrical charger of claim 12, wherein the pushing pillar defines a locking groove corresponding to the locking cutout of the locking sidewall; and when the pushing pillar is slid to a position where the locking groove aligns with the locking cutout, the transmission piece automatically rotates and the locking protrusion inserts into the locking groove via the locking cutout thereby restricting the pushing pillar from sliding upwards.

14. The electrical charger of claim 13, wherein the button is adapted to be slidable relative to the base board and is engaged with the engaging arm; and when the button is pressed and presses the engaging arm down, the engaging arm is pushed to rotate towards the locking sidewall and move the locking protrusion out of the locking groove, whereupon the pushing pillar is pushed to slide up in the restricting unit by restoring force of the first spring.

15. The electrical charger of claim 13, wherein the restricting unit further comprises a restricting sidewall parallel to the locking sidewall, the bottom sidewall connects the locking sidewall with the restricting sidewall, the restricting unit defines an upper opening opposite to the bottom sidewall, and the restricting sidewall comprises a positioning protrusion extending from an inner side surface thereof.

16. The electrical charger of claim 15, wherein the pushing pillar comprises a locking surface corresponding to the locking sidewall, and the locking groove is defined in the locking surface.

17. The electrical charger of claim 16, wherein the pushing pillar further comprises a positioning surface parallel to the locking surface, the pushing pillar further defines a positioning groove in the positioning surface, and the positioning protrusion is located in the positioning groove thereby restricting the range of sliding movement of the pushing pillar.

18. The electrical charger of claim 13, wherein the locking arm comprises a locking part, a connecting part, and a pair of connecting ears, the locking part is perpendicular to the connecting part and is connected to the connecting part by the pair of connecting ears, and the locking protrusion extends from a top end of the locking part along a direction substantially opposite to a direction in which the connecting part extends away from the locking part.

19. The electrical charger of claim 18, wherein the connecting ears are rotatably connected to the locking sidewall, and the transmission piece is biased by a torsion spring such that the torsion spring urges the transmission piece to rotate and cause the locking protrusion to insert into the locking groove when the locking groove aligns with the locking cutout.

20. A pop-up mechanism comprising:

a base board;

a restricting unit connected to and substantially parallel to the base board, the restricting unit comprising a vertical locking sidewall and a bottom sidewall connecting the locking sidewall, the locking sidewall defining a locking cutout therein;

a pushing pillar slidably received in the restricting unit and resiliently connected to the bottom sidewall of the restricting unit via a first spring, the pushing pillar defining a locking groove corresponding to the locking cutout of the locking sidewall;

a transmission piece rotatably connected to the locking sidewall and comprising a locking arm and an engaging arm coupled to the locking arm, the locking arm comprising a locking protrusion aligned with the locking cutout of the locking sidewall; and a button slidable relative to the base board, the button positioned above the engaging arm for pressing the engaging arm down;

wherein when the pushing pillar is slid to a position where the locking groove aligns with the locking cutout, the transmission piece automatically rotates and the locking protrusion inserts into the locking groove via the locking cutout thereby restricting the pushing pillar from sliding; and when the button is pressed and presses the engaging arm down, the transmission piece rotates and moves the locking protrusion of the locking arm out of the locking groove, whereupon the pushing pillar is pushed to slide up in the restricting unit by restoring force of the first spring.

* * * * *